US008868325B2

(12) United States Patent
Morotomi et al.

(10) Patent No.: US 8,868,325 B2
(45) Date of Patent: Oct. 21, 2014

(54) COLLISION JUDGMENT APPARATUS FOR VEHICLE

(75) Inventors: Kohei Morotomi, Susono (JP); Takeshi Nanami, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 217 days.

(21) Appl. No.: 13/639,436

(22) PCT Filed: Apr. 5, 2010

(86) PCT No.: PCT/JP2010/056190
§ 371 (c)(1),
(2), (4) Date: Oct. 4, 2012

(87) PCT Pub. No.: WO2011/125168
PCT Pub. Date: Oct. 13, 2011

(65) Prior Publication Data
US 2013/0030686 A1     Jan. 31, 2013

(51) Int. Cl.
*G06F 17/10* (2006.01)
*G06G 7/78* (2006.01)
*G08G 1/16* (2006.01)
*B60W 30/095* (2012.01)
*B60R 21/0134* (2006.01)
*B60W 30/18* (2012.01)
*G01S 13/93* (2006.01)

(52) U.S. Cl.
CPC .......... *G08G 1/167* (2013.01); *B60W 30/18145* (2013.01); *G01S 13/931* (2013.01); *B60W 30/0953* (2013.01); *B60R 21/0134* (2013.01); *B60W 2550/146* (2013.01)
USPC .......................................... 701/301; 701/300

(58) Field of Classification Search
USPC ......... 701/301, 37, 49, 22, 41, 19, 36, 94, 96, 701/70, 300, 533, 51, 23, 117, 1, 469, 3, 45, 701/50; 340/435, 439, 436, 903; 180/65, 180/282; 705/24
See application file for complete search history.

(56) References Cited

U.S. PATENT DOCUMENTS 4,623,966 A * 11/1986 O'Sullivan ..................... 701/301
5,631,639 A *  5/1997 Hibino et al. .................. 340/903
(Continued)

FOREIGN PATENT DOCUMENTS

JP      3-016846 A     1/1991
JP      9-175295 A     7/1997
(Continued)

*Primary Examiner* — Thomas G Black
*Assistant Examiner* — Robert Payne
(74) *Attorney, Agent, or Firm* — Gifford, Krass, Sprinkle, Anderson & Citkowski, P.C.

(57) ABSTRACT

A correct collision judgment is realized between an obstacle and a vehicle even when the vehicle enters a curve. In a collision judgment apparatus for judging the collision between the vehicle and the obstacle based on a relative positional relationship between a subject vehicle position of the vehicle and a relative movement straight line of the obstacle with respect to the vehicle as calculated based on a plurality of pieces of the position information acquired by a position information acquiring unit in relation to the obstacle, the relative positional relationship between the relative movement straight line and the subject vehicle position is adjusted so that a distance between the relative movement straight line and the subject vehicle position is separated if it is judged that the vehicle enters an entrance to a curve as compared with a situation in which the vehicle does not enter the entrance to the curve.

10 Claims, 10 Drawing Sheets

(56) References Cited

U.S. PATENT DOCUMENTS

| | | | |
|---|---|---|---|
| 5,751,211 A * | 5/1998 | Shirai et al. | 340/435 |
| 5,754,099 A * | 5/1998 | Nishimura et al. | 340/435 |
| 5,793,325 A | 8/1998 | Yamada | |
| 5,818,355 A | 10/1998 | Shirai et al. | |
| 5,904,730 A * | 5/1999 | Yamazaki et al. | 701/301 |
| 5,936,549 A * | 8/1999 | Tsuchiya | 340/903 |
| 6,405,132 B1 * | 6/2002 | Breed et al. | 701/301 |
| 6,429,812 B1 * | 8/2002 | Hoffberg | 342/357.31 |
| 6,898,528 B2 * | 5/2005 | Zorka et al. | 701/301 |
| 7,295,925 B2 * | 11/2007 | Breed et al. | 701/301 |
| 7,418,346 B2 * | 8/2008 | Breed et al. | 701/301 |
| 7,426,437 B2 * | 9/2008 | Breed et al. | 701/301 |
| 7,437,244 B2 * | 10/2008 | Okada | 701/301 |
| 7,710,248 B2 * | 5/2010 | Greene et al. | 340/436 |
| 7,792,641 B2 * | 9/2010 | Liu et al. | 701/301 |
| 7,797,107 B2 * | 9/2010 | Shiller | 701/301 |
| 7,840,355 B2 * | 11/2010 | Breed et al. | 701/301 |
| 7,848,884 B2 * | 12/2010 | Kawasaki | 701/301 |
| 7,848,886 B2 * | 12/2010 | Kawasaki | 701/301 |
| 7,881,868 B2 * | 2/2011 | Greene et al. | 701/301 |
| 8,000,897 B2 * | 8/2011 | Breed et al. | 701/301 |
| 8,026,799 B2 * | 9/2011 | Isaji et al. | 340/435 |
| 8,095,313 B1 * | 1/2012 | Blackburn | 701/301 |
| 8,350,685 B2 * | 1/2013 | Tanabe | 340/436 |
| 8,352,173 B2 * | 1/2013 | Greene et al. | 701/301 |
| 8,380,367 B2 * | 2/2013 | Schultz et al. | 701/3 |
| 8,473,188 B2 * | 6/2013 | Tanabe | 701/301 |
| 8,762,043 B2 * | 6/2014 | Eidehall et al. | 701/301 |
| 2001/0051853 A1 * | 12/2001 | Evans | 701/301 |
| 2003/0191568 A1 * | 10/2003 | Breed | 701/36 |
| 2004/0019425 A1 * | 1/2004 | Zorka et al. | 701/301 |
| 2005/0033516 A1 * | 2/2005 | Kawasaki | 701/301 |
| 2005/0134440 A1 * | 6/2005 | Breed | 340/435 |
| 2005/0165550 A1 * | 7/2005 | Okada | 701/301 |
| 2007/0021915 A1 * | 1/2007 | Breed et al. | 701/301 |
| 2007/0152804 A1 * | 7/2007 | Breed et al. | 340/435 |
| 2008/0059015 A1 * | 3/2008 | Whittaker et al. | 701/23 |
| 2008/0074246 A1 * | 3/2008 | Isaji et al. | 340/435 |
| 2008/0077296 A1 * | 3/2008 | Kawasaki | 701/45 |
| 2008/0133136 A1 * | 6/2008 | Breed et al. | 701/301 |
| 2008/0201077 A1 * | 8/2008 | Tanabe | 701/301 |
| 2008/0269992 A1 * | 10/2008 | Kawasaki | 701/45 |
| 2008/0306691 A1 * | 12/2008 | Louis et al. | 701/301 |
| 2008/0312830 A1 * | 12/2008 | Liu et al. | 701/301 |
| 2008/0312831 A1 * | 12/2008 | Greene et al. | 701/301 |
| 2008/0312832 A1 * | 12/2008 | Greene et al. | 701/301 |
| 2008/0312833 A1 * | 12/2008 | Greene et al. | 701/301 |
| 2009/0024323 A1 * | 1/2009 | Tanabe | 701/301 |
| 2009/0033540 A1 * | 2/2009 | Breed et al. | 342/29 |
| 2009/0099728 A1 * | 4/2009 | Ichinose et al. | 701/39 |
| 2009/0125237 A1 * | 5/2009 | Kitagawa et al. | 701/301 |
| 2009/0164080 A1 * | 6/2009 | Kurata et al. | 701/70 |
| 2009/0164082 A1 * | 6/2009 | Kobayashi et al. | 701/94 |
| 2009/0177359 A1 * | 7/2009 | Ihara et al. | 701/45 |
| 2009/0192710 A1 * | 7/2009 | Eidehall et al. | 701/301 |
| 2009/0222166 A1 * | 9/2009 | Arbitmann et al. | 701/41 |
| 2009/0248270 A1 * | 10/2009 | Sekiguchi | 701/96 |
| 2010/0030426 A1 * | 2/2010 | Okita | 701/41 |
| 2010/0063735 A1 * | 3/2010 | Kindo et al. | 701/300 |
| 2010/0106387 A1 * | 4/2010 | Tsuchida | 701/70 |
| 2010/0106419 A1 * | 4/2010 | Flotte et al. | 701/301 |
| 2010/0169009 A1 * | 7/2010 | Breed et al. | 701/208 |
| 2010/0280751 A1 * | 11/2010 | Breed | 701/207 |
| 2011/0160950 A1 * | 6/2011 | Naderhirn et al. | 701/28 |
| 2012/0035788 A1 * | 2/2012 | Trepagnier et al. | 701/3 |
| 2012/0095651 A1 * | 4/2012 | Anderson | 701/50 |
| 2012/0191313 A1 * | 7/2012 | Miyahara | 701/70 |
| 2012/0191900 A1 * | 7/2012 | Kunimatsu et al. | 711/103 |
| 2012/0323474 A1 * | 12/2012 | Breed et al. | 701/117 |
| 2012/0323477 A1 * | 12/2012 | Flehmig | 701/301 |

FOREIGN PATENT DOCUMENTS

| | | |
|---|---|---|
| JP | H09222477 A | 8/1997 |
| JP | 2004-038245 A | 2/2004 |
| JP | 2004-110394 A | 4/2004 |
| JP | 2007-004711 A | 1/2007 |
| JP | 2009-139320 A | 6/2009 |

* cited by examiner

COLLISION JUDGMENT APPARATUS FOR VEHICLE

TECHNICAL FIELD

The present invention relates to an apparatus for judging the collision between an obstacle and a vehicle in the traveling direction during the traveling of the vehicle.

BACKGROUND ART

The driving assistance for a vehicle is exemplified by the detection of an obstacle in the traveling direction of the vehicle to issue a warning if it is feared that the vehicle may collide with the obstacle (see, for example, Patent Document 1). In this technique, the obstacle, which exists in the traveling direction of the vehicle, is detected by a radar. An approximate straight line, which indicates the movement locus of the obstacle, is calculated from the position information of the obstacle with respect to the vehicle. Thus, the presence of the obstacle is recognized. If the relative relationship between the approximate straight line and the vehicle meets a certain condition, then it is regarded that there is a fear of collision between the obstacle and the vehicle, and a warning is issued.

PRECEDING TECHNICAL DOCUMENT

Patent Document

Patent Document 1: Japanese Patent Application Laid Open Publication No. 03 (1991)-16846

SUMMARY OF THE INVENTION

The Problems to be Solved by the Invention

When the collision is judged between a vehicle and an obstacle, a judgment is made such that it is feared that the obstacle and the vehicle may collide with each other, if the relationship between the vehicle and a relative movement straight line of the obstacle with respect to the vehicle meets a certain condition, for example, if an extension of the movement straight line interferes with the inside of an area in which the vehicle exists. That is, it is judged that there is a fear of collision, if it is judged that the vehicle exists on the line of the relative movement of the obstacle or in the area disposed closely thereto. The result of the judgment is utilized for various types of the vehicle driving assistance in order to make it possible to avoid the collision beforehand.

In this context, it is generally considered that a larger number of pieces of position information of the obstacle are preferably used as much as possible in order to correctly determine the relative movement straight line of the obstacle with respect to the vehicle. However, in such a state that the road (cruising road), on which the vehicle travels, is curved and the vehicle enters the entrance to the curve, the obstacle, which approaches closely to the vehicle in the traveling direction, has the relative position which is greatly varied in the widthwise direction of the vehicle in a relatively short period of time. In such a situation, if a relatively large amount of the position information of the obstacle, which is obtained until the vehicle approaches the entrance to the curve, is utilized in order to calculate the relative movement straight line of the obstacle, then the calculation is consequently affected strongly by the position information obtained until the vehicle approaches the entrance to the curve, and the position information of the obstacle, which is obtained when the vehicle is entering the entrance to the curve, is not reflected effectively. It is feared that it may be difficult to obtain an appropriate locus as the movement straight line of the obstacle in order to perform the collision judgment.

For example, when the obstacle is arranged along the shape of the cruising road, the relative movement straight line of the obstacle, which is provided during the period until the vehicle approaches the curve, is generally provided to extend linearly while adjoining closely to the vehicle. In this situation, when the vehicle enters the entrance to the curve, the relative position of the obstacle is greatly displaced in the widthwise direction of the vehicle in a short period of time before and after the entry. However, when the relative movement straight line of the obstacle is calculated, if the position information of the obstacle, which is obtained during the period until the vehicle approaches the curve, is utilized in a relatively large amount, then the influence of the position information of the obstacle obtained when the vehicle is entering the curve is weakened. As a result, the movement straight line does not reflect the relative position of the obstacle which is obtained when the obstacle approaches closely to the vehicle and which is important to judge the collision. It is feared that it may be difficult to make any correct collision judgment.

The present invention has been made taking the foregoing problem into consideration, an object of which is to provide a collision judgment apparatus which is capable of making a correct collision judgment even when a vehicle is entering a curve.

Means for Solving the Problems

In the present invention, in order to solve the problem as described above, an attention is paid to a relative positional relationship between a subject vehicle position of a vehicle and a relative movement straight line which indicates a movement locus of an obstacle when the collision judgment is performed by a collision judging unit. That is, in the present invention, the relative positional relationship between the relative movement straight line and the subject vehicle position of the vehicle is allowed to differ between a situation in which the vehicle enters an entrance to a curve and a situation in which the vehicle does not enter the same. Thus, the present invention makes it possible to provide the correct collision judgment in each of the cases. In this specification, the direction, which is perpendicular to the traveling direction of the vehicle, is also referred to as "widthwise direction of the vehicle" in some cases. The expressions of "proximal" and "distal" are the expressions which are based on the distance with respect to the vehicle in the traveling direction. Therefore, the "distal" position means that the object or obstacle is positioned farther from the vehicle in the traveling direction as compared with the "proximal" position.

In particular, the present invention resides in a collision judgment apparatus for a vehicle; comprising a position information acquiring unit which acquires position information of an obstacle positioned in a traveling direction of the vehicle based on a received signal obtained by transmitting an electromagnetic wave from the vehicle to the obstacle and receiving a reflected wave from the obstacle; a collision judging unit which judges collision between the vehicle and the obstacle based on a relative positional relationship between a subject vehicle position of the vehicle and a relative movement straight line of the obstacle with respect to the vehicle as calculated based on a plurality of pieces of the position information acquired by the position information acquiring unit in relation to the obstacle; a curve judging unit which judges a curved state of a cruising road on which the vehicle travels;

and an adjusting unit which adjusts the relative positional relationship between the relative movement straight line and the subject vehicle position so that a distance between the relative movement straight line and the subject vehicle position is more separated if it is judged by the curve judging unit that the vehicle is entering an entrance to a curve as compared with a situation in which the vehicle is not entering the entrance to the curve when collision judgment is performed by the collision judging unit.

The collision judgment apparatus for the vehicle according to the present invention performs the judgment of the collision between the obstacle and the vehicle based on the position information of the obstacle acquired by the position information acquiring unit. The position information acquiring unit periodically or intermittently acquires the position information of the obstacle existing in the traveling direction of the vehicle as the vehicle travels. Accordingly, the relative movement straight line, which is the relative movement locus of the obstacle to indicate the way of approach of the obstacle to the vehicle, is calculated based on the plurality of pieces of the position information of the obstacle having been already acquired. The collision judging unit makes the judgment of the collision with the obstacle based on the relative positional relationship between the calculated relative movement straight line and the subject vehicle position of the vehicle.

In this context, in the collision judging apparatus as described above, the adjustment is performed by the adjusting unit so that the collision judgment, which is made by the collision judging unit when the vehicle is entering the entrance to the curve during the traveling on the cruising road, is different from the collision judgment which is made by the collision judging unit when the vehicle is not entering the same. That is, if the vehicle is entering the entrance to the curve when the collision judgment is performed by the collision judging unit, then the adjusting unit adjusts the relative positional relationship between the relative movement straight line and the subject vehicle position so that the distance between the relative movement straight line and the subject vehicle position is more separated as compared with the situation in which the vehicle is not entering the entrance to the curve. Based on this adjustment, the collision judgment is performed by the collision judging unit. In other words, under the premise that the collision judgment is performed by the collision judging unit, the adjusting unit adjusts the relative positional relationship between the relative movement straight line and the subject vehicle position so that it becomes difficult that the relative movement straight line interferes with the subject vehicle position.

In relation thereto, when the vehicle enters the entrance to the curve, the relative position of the obstacle with respect to the vehicle is varied in the widthwise direction of the vehicle in a relatively short period of time. However, when the relative movement straight line is calculated, the plurality of pieces of the position information of the obstacle, which have been already acquired, are utilized. Therefore, there is such a possibility that the relative movement straight line cannot precisely reflect the position information of the obstacle allowed to approach closely to the vehicle. In this case, it is necessary to mitigate the influence which is exerted on the relative movement straight line by the position information of the obstacle obtained until the vehicle enters the entrance to the curve, i.e., the movement locus of the obstacle allowed to approach closely to the vehicle generally linearly. In view of the above, the adjusting unit performs the adjustment in the situation as described above so that the distance between the relative movement straight line and the subject vehicle position is more separated as compared with when the vehicle is not entering the entrance to the curve. Accordingly, it is possible to calculate the relative movement straight line which precisely reflects the position information of the obstacle allowed to approach closely to the vehicle. Thus, it is possible to perform the correct collision judgment even when the vehicle enters the entrance to the curve.

Various conventional techniques can be utilized for the judgment performed by the curve judging unit. For example, the curve radius of the road for allowing the vehicle to travel thereon may be calculated based on a vehicle velocity and a yaw rate of the vehicle, and the curved state of the cruising road may be judged based on an obtained value thereof. When an apparatus or device such as a car navigation device or the like, which utilizes the map information, is carried on the vehicle, the curved state of the cruising road may be judged based on the map information.

In the collision judgment apparatus for the vehicle as described above, the adjusting unit may decrease the number of pieces of the position information of the obstacle used to calculate the relative movement straight line when the vehicle is not entering the entrance to the curve to provide a predetermined number of pieces of the position information from which one piece or a plurality of pieces of the position information provided on a distal side with respect to the vehicle is/are excluded so that the relative movement straight line is calculated based on the predetermined number of pieces of the position information. That is, when the relative movement straight line is calculated, the position information of the obstacle provided on the distal side with respect to the vehicle is excluded. Accordingly, it is possible to mitigate the influence which is exerted on the relative movement straight line by the movement locus of the obstacle allowed to approach closely to the vehicle generally linearly as described above.

The predetermined number described above, which relates to the position information as the calculation basis for calculating the relative movement straight line, may have a fixed value. Alternatively, the predetermined number may be varied in accordance with, for example, the size of the curve of the cruising road. That is, the adjusting unit may change the predetermined number of pieces of the position information of the obstacle in order to calculate the relative movement straight line depending on a size of the curve of the cruising road as judged by the curve judging unit. When the size of the curve (curve radius) of the cruising road is decreased, the displacement amount of the obstacle in the widthwise direction is increased when the vehicle enters the entrance to the curve. Therefore, when the predetermined number is more decreased, the position information of the obstacle allowed to approach closely to the vehicle can be precisely reflected on the relative movement straight line.

The collision judging unit may judge that the vehicle collides with the obstacle if the relative movement straight line of the obstacle interferes with a subject vehicle area corresponding to the subject vehicle position of the vehicle; and the adjusting unit may narrow, in this case, the subject vehicle area in a widthwise direction intersecting the traveling direction of the vehicle if it is judged by the curve judging unit that the vehicle is entering the entrance to the curve, as another method for the adjustment of the relative positional relationship between the relative movement straight line and the subject vehicle position to be performed by the adjusting unit. When the vehicle enters the entrance to the curve, the displacement amount of the obstacle in the widthwise direction with respect to the vehicle is increased as described above. Based on this fact, the width of the subject vehicle area of the vehicle is narrowed in the collision judgment. As a result, the state is given thereby, in which the relative positional relationship between the relative movement straight line and the vehicle is more separated from each other. Accordingly, the collision between the obstacle and the vehicle is judged based on the correct recognition of the movement of the obstacle which is greatly displaced in the widthwise direction with respect to the vehicle. Therefore, it is possible to expect the correct collision judgment.

In the collision judgment apparatus as described above, when the curve judging unit judges the curved state of the cruising road in accordance with a predetermined parameter in relation to an amount of change of a size of the curve calculated based on a vehicle velocity and a yaw rate of the vehicle; the predetermined parameter may be variable depending on the vehicle velocity of the vehicle. The curved state of the road, for example, the curve radius can be calculated in accordance with the physical principle from the relationship between the vehicle velocity and the yaw rate of the vehicle traveling along the curve. When the vehicle intends to enter the entrance to the curve from a state in which the vehicle travels along a straight portion of the road, the time-dependent change amount (time change amount) of the calculated curve radius is greatly changed. Accordingly, it is possible to judge whether or not the vehicle enters the entrance to the curve based on the change amount. However, the concerning judgment utilizes the yaw rate of the vehicle simultaneously therewith, which is affected by the drift or wandering of the vehicle (rotation action of the vehicle irrelevant to the traveling along the curve). In particular, when the vehicle is at a low velocity, the influence of the drift or wandering is increased. Therefore, when the predetermined parameter is variable depending on the vehicle velocity of the vehicle, it is possible to judge the entry to the entrance to the curve while avoiding the influence of the drift or wandering.

For example, the predetermined parameter may be set so that it is difficult to judge that the vehicle enters the entrance to the curve if the vehicle velocity of the vehicle is low as compared with if the vehicle velocity is high. In this way, the influence of the drift or wandering is avoided, which would be otherwise exerted when the vehicle travels at a low velocity.

In the collision judgment apparatus as described above, the adjusting unit may restore the relative positional relationship between the relative movement straight line and the subject vehicle position in the collision judgment performed by the collision judging unit to a state provided before the vehicle enters the entrance to the curve, if it is judged by the curve judging unit that the vehicle passes through the entrance to the curve. Accordingly, it is possible to realize the precise judgment process when the vehicle enters the entrance to the curve as well as when the vehicle does not enter the entrance to the curve.

Effect of the Invention

It is possible to make the correct collision judgment between the obstacle and the vehicle even when the vehicle enters the curve.

DETAILED DESCRIPTION OF THE INVENTION

An explanation will be made below with reference to the drawings about a vehicle safety controller which functions as an apparatus for judging the collision of a vehicle and which performs the safety control for the entire vehicle according to an embodiment of the present invention. The structure or arrangement of the following embodiment is exemplified by way of example. The present invention is not limited to the structure or arrangement of the embodiment.

First Embodiment

Figure 1:
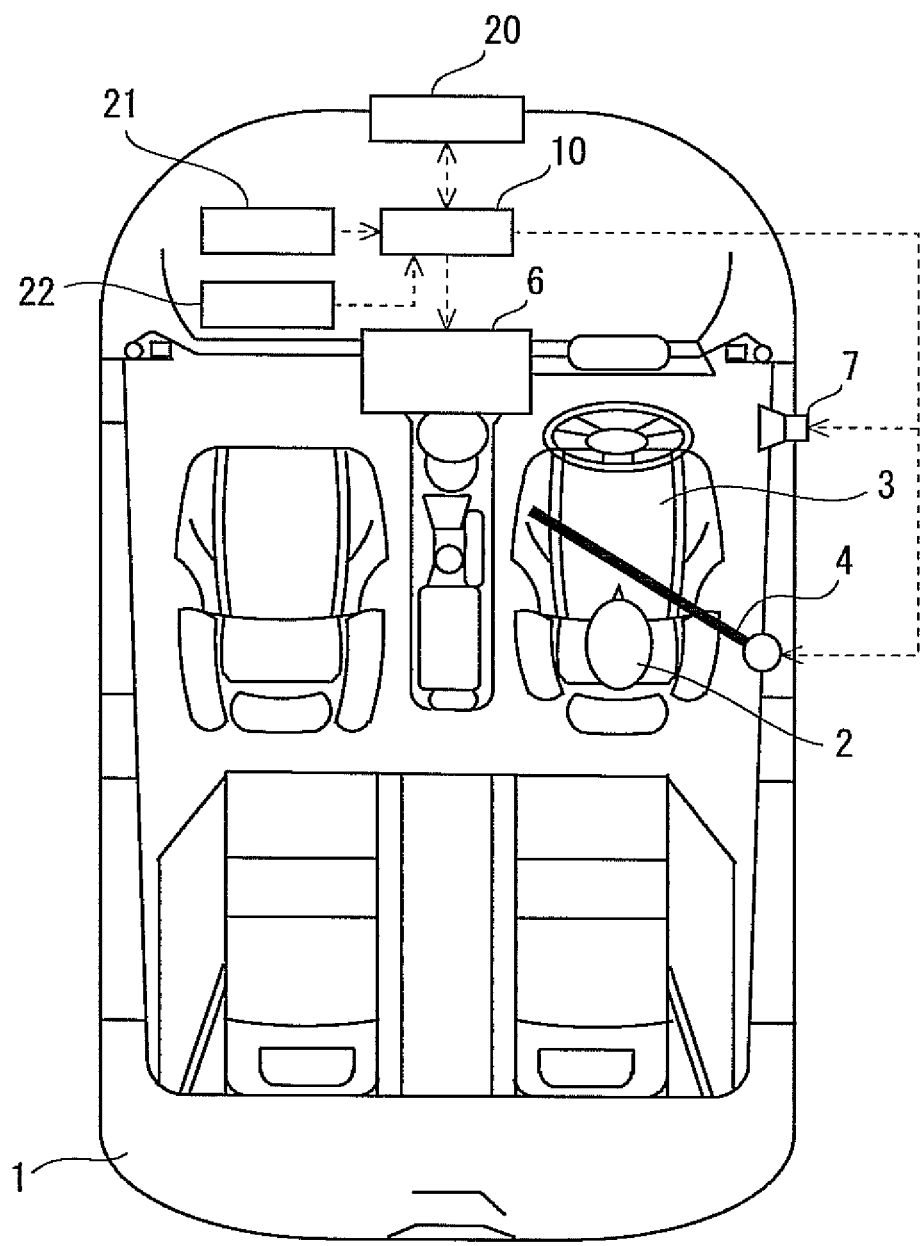
FIG. 1 shows a schematic arrangement of a vehicle on which a vehicle safety controller corresponding to the collision judgment apparatus according to the present invention is carried.

FIG. 1 shows a schematic arrangement of a vehicle 1 on which the vehicle safety controller 10 described above is carried. Four seats are provided in the vehicle 1. FIG. 1 shows a state in which a driver 2 sits on a driver's seat 3. The driver 2 uses a seat belt 4 installed for the driver's seat 3, and thus the driver 2 can be secured during the driving. In this arrangement, a so-called in-vehicle device (onboard device) 6 is installed at a panel portion disposed leftwardly in front of the driver's seat 3. As for the in-vehicle device 6, a display device, which displays the information processed by the in-vehicle device, is depicted as a constitutive component thereof. Specifically, the in-vehicle device 6 is the information processing device which plays back the music in the vehicle 1 and which executes the car navigation based on the detection signal of a GPS device (Global Positioning System) and the map information included in a recording device installed distinctly from the in-vehicle device. The information processed by the in-vehicle device 6 is displayed on the display device in order to inform the driver 2 and other passengers of the information, if necessary.

In this arrangement, the vehicle 1 shown in FIG. 1 carries thereon a radar device 20 which is capable of detecting or sensing the information in relation to the relative position of the obstacle with respect to the vehicle 1 by transmitting a millimeter wave having a detection range disposed frontwardly in the traveling direction of the vehicle 1 and receiving the reflected wave reflected by the obstacle disposed outside the vehicle. Further, the vehicle 1 carries thereon a vehicle velocity sensor 21 which detects the vehicle velocity and a yaw rate sensor 22 which detects the yaw rate. The radar device 20, the vehicle velocity sensor 21, and the yaw rate sensor 22 are electrically connected to the vehicle safety controller 10. The respective detection results are delivered to the vehicle safety controller 10. The vehicle safety controller 10 carries out, for example, the recognition of the obstacle in the traveling direction of the vehicle 1, the judgment of the collision with the obstacle, and the safety control by utilizing the judgment result.

Specifically, the vehicle safety controller 10 is the controller which executes the safety control in relation to the vehicle 1. In particular, the vehicle safety controller 10 performs the control in relation to the personal safety during the driving of the passenger who boards the vehicle 1. An example of the safety control is exemplified such that the obstacle is detected in the traveling direction of the vehicle 1 based on the detection result obtained by the radar device 20 to draw an attention of, for example, the driver 2 if there is any possibility of collision with the obstacle. Specified techniques to draw the attention can be exemplified by various methods having been hitherto utilized, including, for example, a method in which an alarm is noticed with a screen image and/or voice by means of the display device of the in-vehicle device 6 and/or a speaker 7 provided in the vehicle 1, and a method in which a force is allowed to act on the driver 2 by means of the seat belt 4 installed by the driver 2.

Figure 2:
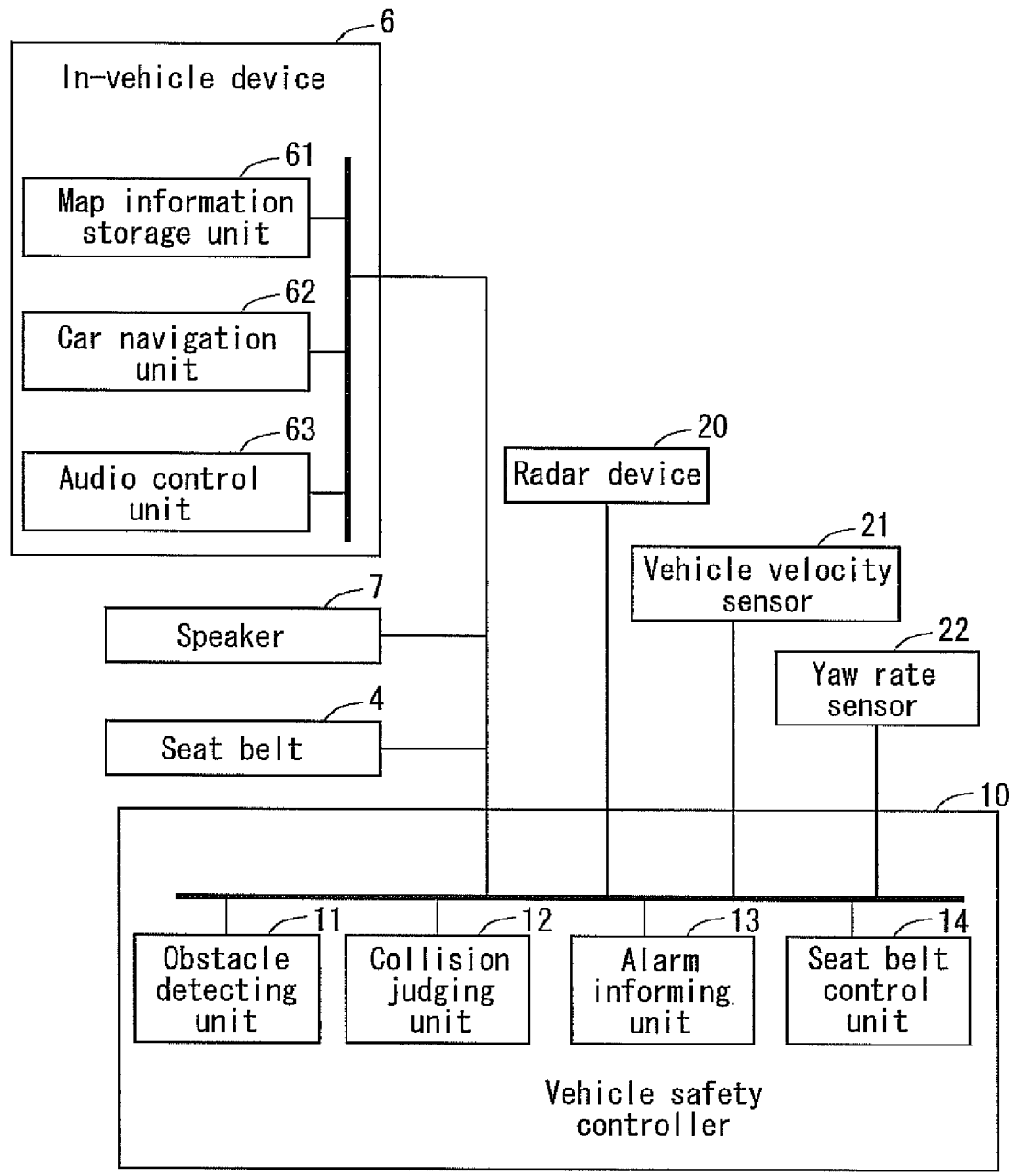
FIG. 2 shows a functional block diagram illustrating, as an image, functional units possessed by the vehicle safety controller shown in FIG. 1.

In the vehicle 1 shown in FIG. 1, various types of the safety control are executed by the vehicle safety controller 10 in order to achieve the predetermined object as described above based on the result of the judgment of the collision with the obstacle performed in the vehicle safety controller 10. In this context, FIG. 2 shows a functional block diagram illustrating, as an image, the contents of various types of the control in relation to the safety control in the vehicle 1 to be principally performed by the vehicle safety controller 10. The vehicle safety controller 10 and the in-vehicle device 6 shown in FIG. 2 substantially correspond to a computer including, for example, CPU, a memory and a hard disk. The control program is executed therein, and thus the functions based on the respective functional blocks shown in FIG. 2 are realized.

At first, an explanation will be made about functional units possessed by the vehicle safety controller 10. The vehicle safety controller 10 has the functional units of an obstacle detecting unit 11, a collision judging unit 12, an alarm informing unit 13, and a seat belt control unit 14. These functional units are referred to by way of example in every sense. It is also allowable that the vehicle safety controller 10 has any functional unit other than the foregoing functional units in order to achieve the predetermined object. These functional units will be schematically explained below. The obstacle detecting unit 11 is the functional unit which detects the obstacle existing in the traveling direction of the vehicle 1 based on the detection result obtained by the radar device 20. The technique for detecting the obstacle based on the use of the radar device 20 is the already disclosed technique, for which any detailed explanation will be omitted in this specification.

In the vehicle safety controller 10, the control, which is performed to secure the safety of the driver 2, is executed by the alarm informing unit 13 and the seat belt control unit 14 based on the judgment result to show whether or not the obstacle detected by the obstacle detecting unit 11 may be a dangerous existence with respect to the traveling of the vehicle 1, i.e., the judgment result to show whether or not the detected obstacle collides with the vehicle 1. The alarm informing unit 13 is the functional unit which notices an alarm in order to allow the driver 2 to recognize the existence of the obstacle by means of the display device of the in-vehicle device 6 and the speaker 7 provided in the vehicle 1, and the seat belt control unit 14 is the functional unit which draws an attention of the driver 2 by means of the seat belt 4 in order to allow the driver 2 to recognize the existence of the obstacle in the same manner as described above. The construction or system, in which the judgment result provided by the collision judging unit 12 is used, is formed in the vehicle safety controller 10 as the premise for the safety control performed by the alarm informing unit 13 and the seat belt control unit 14 as described above. The detailed process for the collision judgment performed by the collision judging unit 12 will be described later on.

Next, an explanation will be made about functional units possessed by the in-vehicle device 6. The in-vehicle device 6 has a map information storage unit 61, a car navigation unit 62, and an audio control unit 63. The map information storage unit 61 is the functional unit which stores the map information to be used for the car navigation process executed by the car navigation unit 62. For example, the map information storage unit 61 stores, for example, the position information and the shape information of the road on which the vehicle 1 travels. The car navigation unit 62 provides the navigation information of the vehicle 1 to the driver 2 by the aid of the display device of the in-vehicle device 6 by utilizing the detection signal obtained by the unillustrated GPS device together with the map information. Further, the audio control unit 63 is the functional unit which provides, to the passengers in the vehicle 1, the information in relation to the audio including, for example, the playback of the music and the provision of the screen image and the voice of the television and the radio. The contents of the control performed by the audio control unit 63 reside in the well-known technique, any detailed explanation of which will be omitted in this specification.

Figure 3:
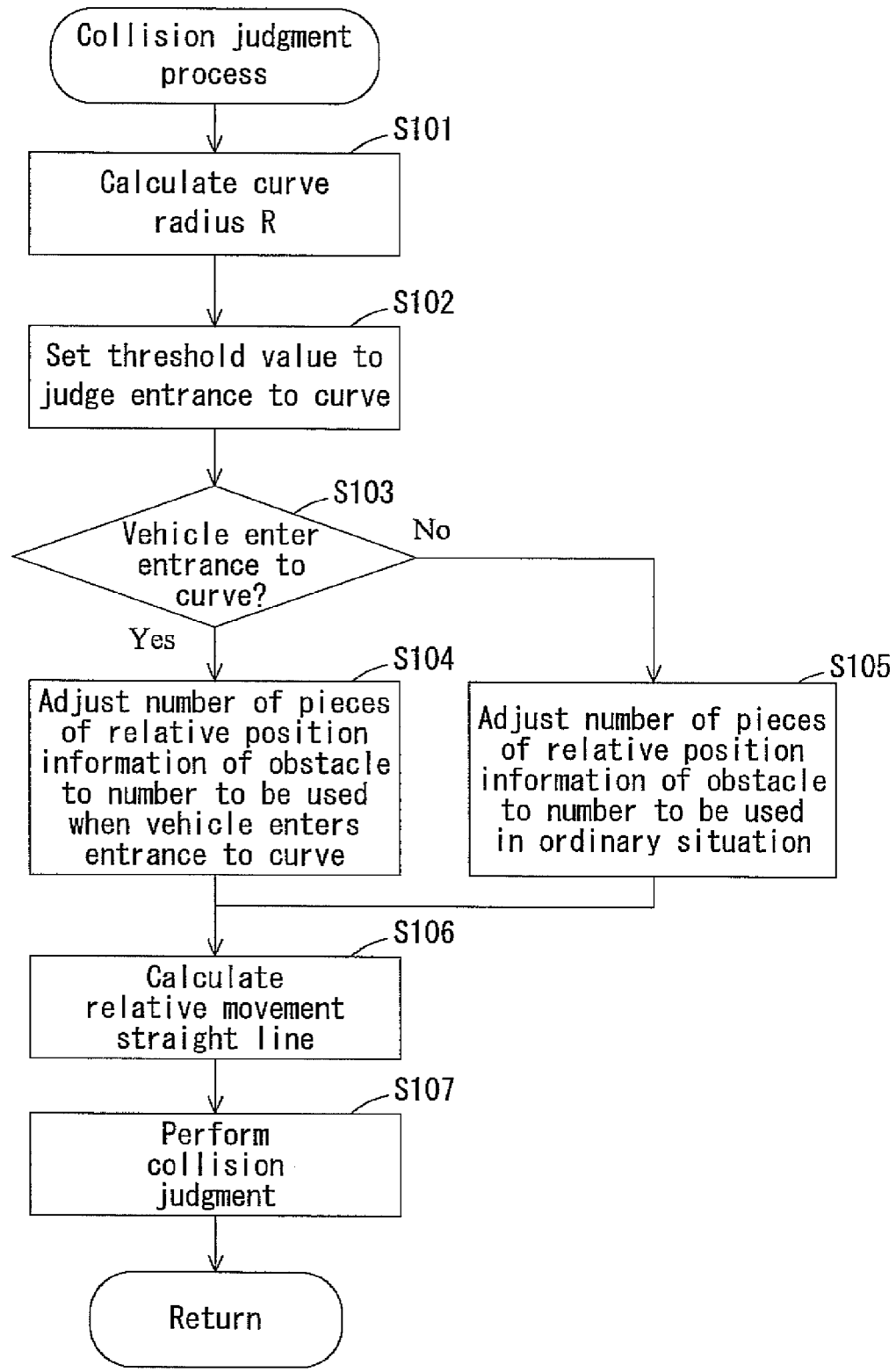
FIG. 3 shows a first flow chart in relation to the collision judgment process executed by the vehicle safety controller shown in FIG. 1.

As described above, the radar device 20, the vehicle velocity sensor 21, and the yaw rate sensor 22 are electrically connected to the vehicle safety controller 10. In this arrangement, the collision judgment process is performed by the collision judging unit 12 formed in the vehicle safety controller 10, and thus the vehicle safety controller 10 functions as the collision judgment apparatus according to the present invention. The collision judgment process will be explained below based on FIG. 3. FIG. 3 shows a flow chart of the collision judgment process to judge the collision between the vehicle 1 and the obstacle against the vehicle 1. The process is realized by a control program to be executed in the vehicle safety controller 10.

The collision judgment process shown in FIG. 3 makes it possible to correctly execute the judgment of the collision with the obstacle especially when the vehicle 1 enters an entrance to a curve. The detection of the obstacle is executed by the obstacle detecting unit 11 at constant time intervals during the period in which the collision judgment process is executed. The detection result is stored in the unillustrated memory included in the vehicle safety controller 10, and the stored information is utilized for the collision judgment process.

At first, in S101, the curve radius R of the road on which the vehicle 1 travels is calculated.

Specifically, the curve radius R of the cruising road is calculated in accordance with the following expression based on the vehicle velocity V of the vehicle 1 detected by the vehicle velocity sensor 21 and the yaw rate $\omega$ of the vehicle 1 detected by the yaw rate sensor 22. If the process in S101 is completed, the routine proceeds to S102.

$$R = V/\omega$$

In S102, R0, which is the threshold value to judge the entrance to the curve to be used in S103 described later on, is set based on the vehicle velocity V of the vehicle 1 detected by the vehicle velocity sensor 21. In S103, it is judged whether or not the vehicle 1 enters the entrance to the curve during the traveling on the road based on whether or not the time change amount R' of the curve radius R calculated in S101 is smaller than the threshold value R0 set in S102. When the vehicle travels on the road, if the shape is linear (straight line), then the curve radius R is theoretically infinite. On the other hand, the curve radius R is more decreased as the curve is steeper. Therefore, when the vehicle 1 intends to pass along the curved road after a state in which the vehicle 1 travels on the linear road, the curve radius R is gradually decreased during the period in which the vehicle 1 enters the entrance to the curve. Therefore, the time change amount R' of the curve radius R has a negative value. Accordingly, in S103, it is judged that the vehicle 1 enters the entrance to the curve at the point in time at which the time change amount R' of the curve radius R is decreased while exceeding the threshold value.

The setting of the threshold value R0 in S102 described above resides in the process to be performed in order to improve the accuracy of the judgment of the entrance to the curve in S103. If the vehicle 1 is at a low velocity, the inertial force of the vehicle 1 is small as compared with if the vehicle 1 is at a high velocity. Therefore, in this situation, the drift or wandering of the vehicle 1, which is caused, for example, by the wind against the vehicle 1 and/or the driving of the driver 2, may be strongly reflected on the yaw rate. In particular, when the vehicle 1 intends to enter the entrance to the curve from the linear road, such a situation is given that the yaw rate is gradually increased from the state in which the yaw rate is approximate to zero. As a result, when it is intended to judge the entry into the entrance to the curve based on the time change amount R' of the curve radius R calculated in S101, the degree of the influence of the yaw rate varies depending on the vehicle velocity of the vehicle 1. Therefore, when the vehicle 1 travels at a low velocity, if the vehicle merely undergoes the drift or wandering, then there is such a possibility that it may be erroneously judged that the vehicle enters the entrance to the curve, while being affected by the yaw rate generated thereby, although the state, in which the vehicle enters the entrance to the curve, is not given.

In view of the above, in S102, in order to avoid the erroneous judgment resulting from the yaw rate as described above, the threshold value R0 is appropriately set in accordance with the vehicle velocity V of the vehicle 1. For example, if the vehicle velocity V is not more than 30 Km/h, the value of the threshold value R0 is the value (for example, −300) which is three times the value (for example, −100) of the threshold value R0 to be provided if the vehicle velocity V is not less than the above. That is, if the vehicle 1 is at a low velocity, the setting is made to the value at which it is difficult to judge that the vehicle 1 enters the entrance to the curve. When the value of the threshold value R0 is adjusted as described above, then the influence of the yaw rate, which is exerted when the vehicle 1 is at a low velocity as described above, can be suppressed, and it is possible to appropriately judge that the vehicle 1 enters the entrance to the curve. As for the setting of the threshold value R0, the value of the threshold value R0 may be gradually changed as the vehicle velocity of the vehicle 1 is changed, in place of the method described above. Alternatively, the value of the threshold value R0 may be changed in a stepwise manner depending on the vehicle velocity of the vehicle 1.

Figure 4:
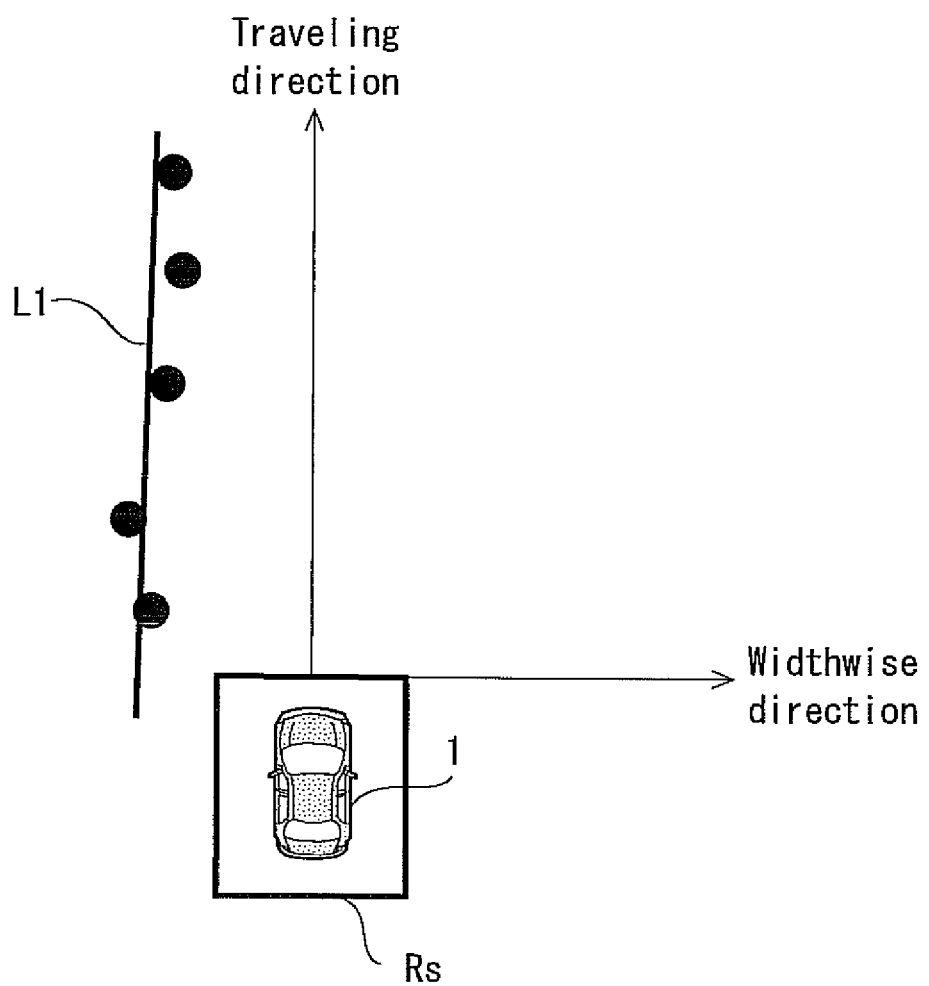
FIG. 4 shows a correlation between an obstacle and a vehicle during the ordinary traveling of the vehicle.

In this procedure, if the affirmative judgment is made in S103, the routine proceeds to S104. If the negative judgment is made, the routine proceeds to S105. In S104 and S105, the processes are performed, in which the number of pieces of the obstacle position information used to calculate a relative movement straight line L1 shown in FIG. 4 is adjusted depending on the traveling state brought about for the vehicle 1, i.e., whether or not the vehicle 1 enters the entrance to the curve. The processes in S104 and S105 correspond to the process performed by the adjusting unit according to the present invention. FIG. 4 shows the relative position change of the obstacle with respect to the vehicle 1, and this drawing illustrates the relative movement straight line calculated based on the pieces of the position information. The relative movement straight line represents, by the straight line, the locus of the relative position of the obstacle with respect to the vehicle 1. The relative movement straight line is calculated based on a plurality of pieces of the information concerning the relative positions of the obstacle with respect to the vehicle 1 having been already detected. In other words, the relative movement straight line expresses, as the straight line, the way of approach of the obstacle closely to the vehicle 1 based on the relative positions of the obstacle obtained in the past. Therefore, when the relative movement straight line intersects the position of the vehicle 1, or when the relative movement straight line approaches extremely closely to the vehicle 1, then it is meant that the obstacle has a possibility to collide with the vehicle 1. In this procedure, the area, in which the vehicle 1 exists, is represented as the subject vehicle area Rs. The subject vehicle area Rs is a rectangular area having a width Wd and a length Lg. Therefore, if the relative movement straight line intersects the subject vehicle area Rs, it is judged that the obstacle and the vehicle 1 may collide with each other. In a state shown in FIG. 4, the relative movement straight line L1 does not intersect the subject vehicle area Rs. Therefore, it is judged that the obstacle and the vehicle 1 do not collide with each other.

Based on the fact that the collision between the vehicle and the obstacle is judged by using the relative movement straight line as described above, it is important to correctly calculate the relative movement straight line. In general, for example, the detection accuracy and the drift or wandering of the vehicle are superimposed on the relative position of the obstacle detected by the obstacle detecting unit 11. Considering this fact, the relative movement straight line is generally calculated by utilizing a relatively large number of pieces of the relative position information of the obstacle, and the relative movement straight line is determined, for example, by using the known least square method. The number of pieces of the position information of the obstacle, which is used to calculate the relative movement straight line L1 shown in FIG. 4, is five by way of example.

Figure 5:
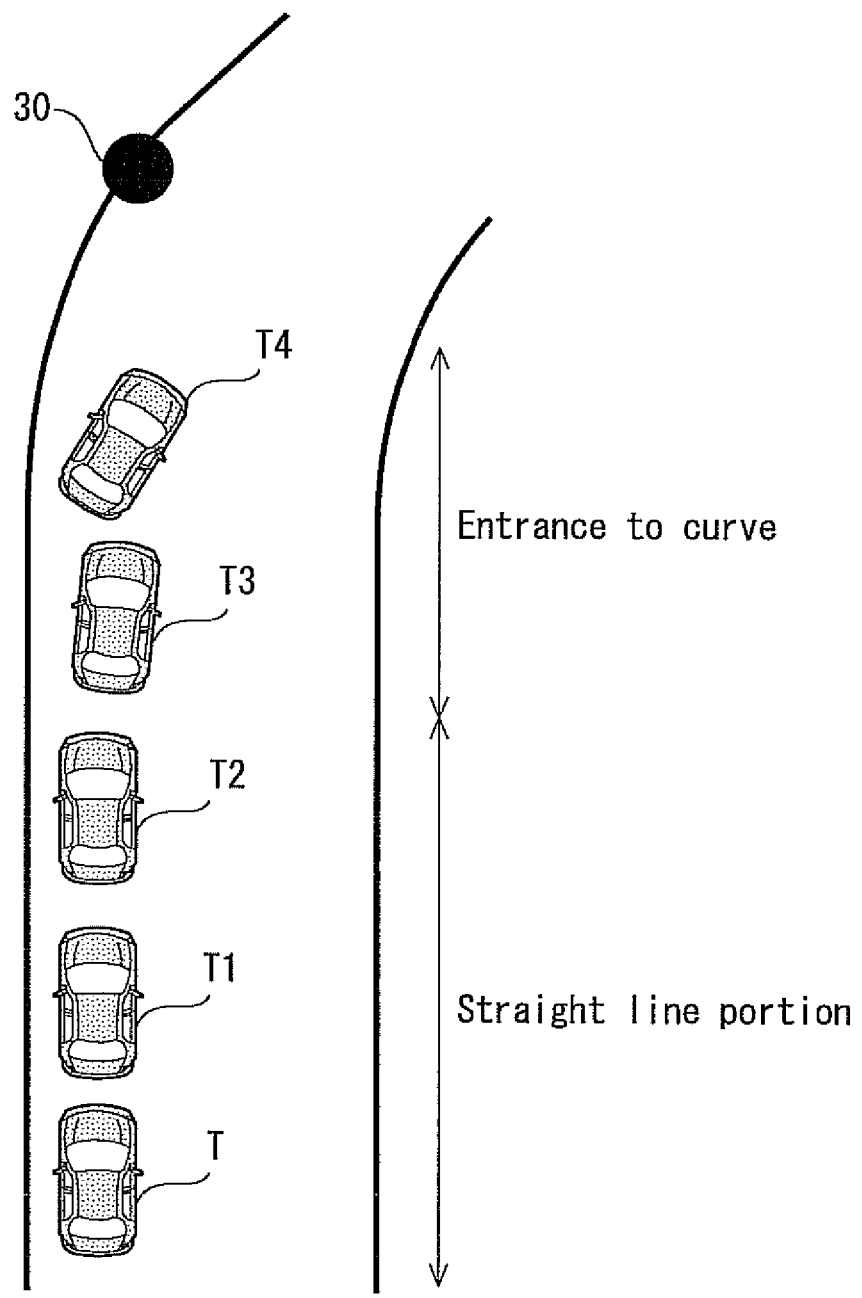
FIG. 5 shows a situation in which the vehicle enters an entrance to a curve when the vehicle travels on a road.
Figure 6:
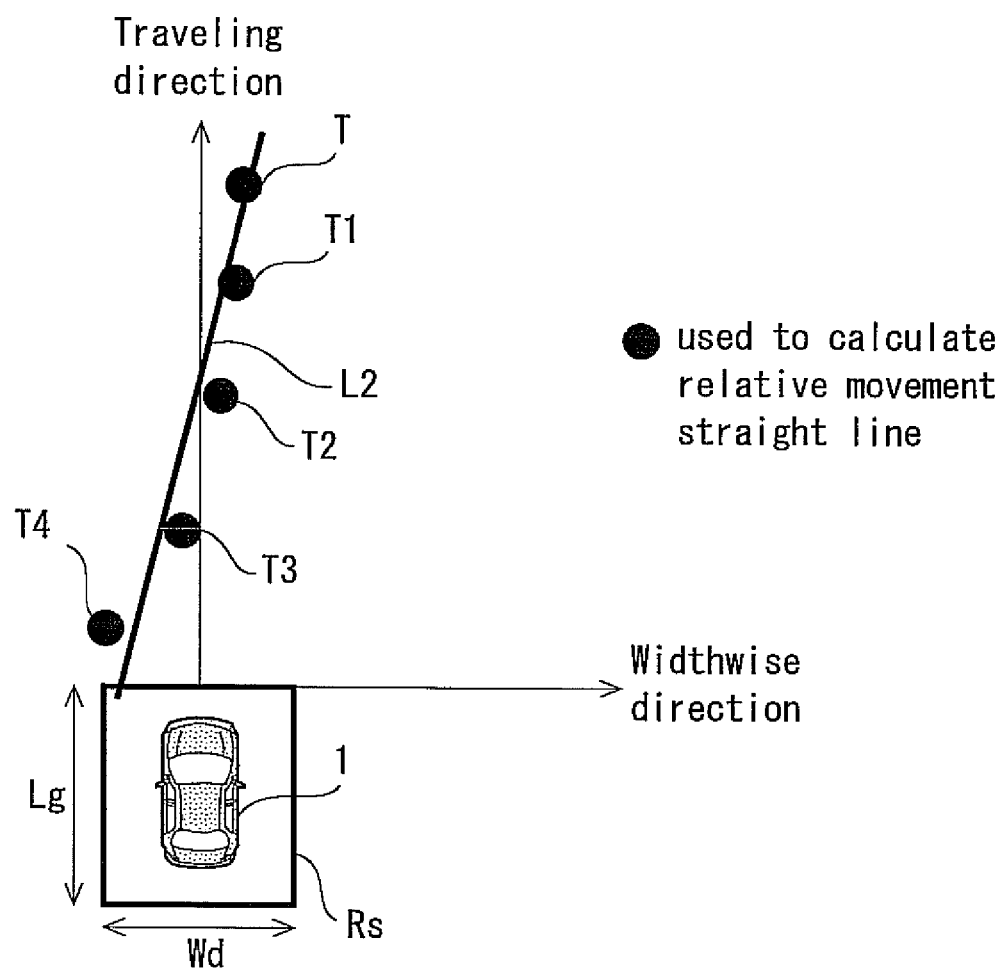
FIG. 6 shows a correlation between an obstacle and the vehicle based on a conventional technique and a relative movement straight line determined from the position information of the obstacle in the situation shown in FIG. 5.

It is now assumed that the road, on which the vehicle 1 travels, is curved, and the obstacle 30 is positioned at the curve portion as shown in FIG. 5. On this assumption, FIG. 6 shows the change of the relative position of the obstacle 30 with respect to the vehicle 1 when the vehicle 1 travels on the road. Solid circles shown in FIG. 6 represent the relative positions of the obstacle 30 with respect to the vehicle 1 at the respective timings shown in FIG. 5. It is assumed that the left-right direction in FIG. 6 is the widthwise direction of the vehicle 1, and the upward-downward direction is the traveling direction of the vehicle 1. In this case, when the vehicle 1 travels on the straight line portion of the road (situations at the timings T, T1, T2), the obstacle 30 moves as if the obstacle 30 approaches the vehicle 1 generally from the front. After that, in order to allow the vehicle 1 to travel along the curve of the road at the timing T3, the orientation or direction thereof begins to be turned to the direction of the curve (rightward direction in this embodiment) to provide a state in which the vehicle 1 enters the entrance to the curve of the road at the timing T4 wherein the orientation thereof is turned relatively largely in the rightward direction. In this situation, the obstacle 30 is greatly displaced with respect to the vehicle 1 so that the obstacle 30 traverses in the widthwise direction.

As described above, when the vehicle 1 intends to travel along the curve, the orientation of the vehicle 1 is greatly changed from that having been provided in the previous state in which the vehicle 1 travels along the straight line portion. Therefore, the relative position of the obstacle with respect to the vehicle 1 is changed relatively largely in the widthwise direction of the vehicle. Especially, the relative position of the obstacle with respect to the vehicle 1 is greatly changed when the obstacle approaches more closely to the vehicle, i.e., when the vehicle 1 enters the entrance to the curve. In such a situation, as shown in FIG. 6, if it is intended to calculate a relative movement straight line L2 in the same manner as in the situation in which the vehicle 1 is not entering the entrance to the curve, it may be judged that the obstacle 30 and the vehicle 1 may collide with each other, because the relative movement straight line L2 calculated in this case intersects the subject vehicle area Rs, although the vehicle 1 actually travels along the curve of the road and the vehicle 1 merely passes along the side of the obstacle 30. The factor of such a judgment resides in that a relatively large number of pieces of the relative position information (three pieces of the five pieces in total in the example shown in FIG. 6) of the obstacle 30, which have been obtained when the vehicle 1 still traveled on the straight line portion of the road, are used when the relative movement straight line L2 is calculated. Therefore, the contribution of the relative position information of the obstacle 30 obtained when the vehicle 1 enters the entrance to the curve is weakened. The great displacement of the obstacle 30 in the widthwise direction of the vehicle 1, i.e., the relative displacement of the obstacle 30 to be separated far from the vehicle 1 is not reflected on the relative movement straight line. As a result, it is considered that the relative movement straight line, which does not reflect the actual relative positions between the vehicle 1 and the obstacle 30, is calculated.

Figure 7:
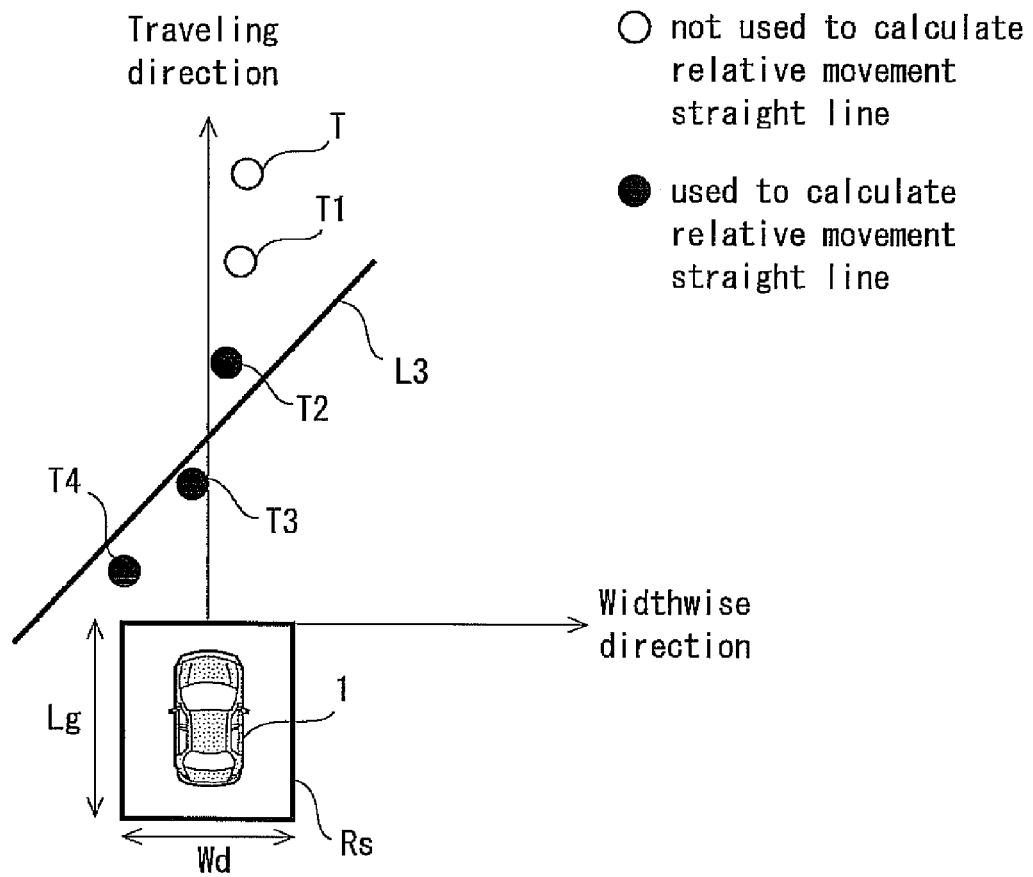
FIG. 7 shows a correlation between the obstacle and the vehicle according to the present invention and a relative movement straight line determined from the position information of the obstacle in the situation shown in FIG. 5.

In view of the above, in this embodiment, the process in S104 is performed so that the large displacement of the obstacle 30 in the widthwise direction of the vehicle 1 when the vehicle 1 is entering the entrance to the curve, i.e., the relative displacement to make separation far from the vehicle 1 is reflected on the calculation of the relative movement straight line. Specifically, as shown in FIG. 7, a relative movement straight line L3 is calculated by using the relative position information of the obstacle disposed on the proximal side with respect to the vehicle 1 without using the relative position information of the obstacle disposed on the distal side with respect to the vehicle 1 as considered to weaken the contribution of the relative position information of the obstacle 30 when the vehicle 1 is entering the entrance to the curve when the relative movement straight line is calculated as described above. That is, in order to precisely grasp the relative movement displacement of the obstacle 30 when the vehicle 1 enters the entrance to the curve, the number of pieces of the position information used to calculate the relative movement straight line L3 is decreased, and the relative position information is limited to the relative position information of the obstacle disposed on the proximal side with respect to the vehicle 1. In the embodiment shown in FIG. 7, the number of pieces of the relative position information of the obstacle 30 used to calculate the relative movement straight line L3 is limited to three (3). When the number of pieces of the position information is decreased as described above, then the influence of the dispersion possessed by each of the pieces of the position information is slightly increased, but this disadvantage is overcome by the fact that the relative movement displacement of the obstacle 30, which is provided when the vehicle 1 enters the entrance to the curve, can be correctly represented as the relative movement straight line. Therefore, it is consequently possible to expect the precise collision judgment.

On the other hand, if the vehicle 1 does not enter the entrance to the curve, i.e., if the negative judgment is made in S103, then the number provided in the ordinary situation, i.e., the number shown in FIG. 4 (five (5) in this embodiment) is maintained without decreasing the number of pieces of the relative position information used to calculate the relative movement straight line while considering the influence of the dispersion possessed by the relative position information of the obstacle 30 (process in S105). By doing so, it is possible to utilize a large number of pieces of the relative position information of the obstacle 30 having been already detected. As a result, it is possible to calculate the more correct relative movement straight line without being affected by the dispersion. The situation, in which the process in S105 is performed, also includes the situation which is provided after the vehicle enters the entrance to the curve and the vehicle passes through the entrance to the curve.

If the process in S104 or S105 is completed, the relative movement straight line is calculated in S106 based on the number of pieces of the relative position information of the obstacle 30 set in each of the processes. Subsequently, in S107, the collision judgment is performed based on the correlation between the relative movement straight line and the subject vehicle area Rs. If the process in S107 is completed, the processes in S101 and the followings are repeated again.

As described above, in the collision judgment process according to this embodiment, the relative displacement of the obstacle to be separated far from the vehicle 1, which is provided when the vehicle 1 is entering the entrance to the curve, can be reliably reflected on the relative movement straight line. Further, when the vehicle 1 is not entering the entrance to the curve, a relatively large number of pieces of the relative position information of the obstacle are utilized. Therefore, the collision judgment can be performed more correctly. In the embodiment described above, the number of pieces of the relative position information of the obstacle set in S104 is three (3). However, this value may be varied depending on the size of the curve along which the vehicle travels. When the curve radius is small, then the relative displacement amount of the obstacle 30 in the widthwise direction of the vehicle 1 is large, and hence the number of pieces of the relative position information of the obstacle used to calculate the relative movement straight line may be further decreased as compared with when the curve radius is large. When the number of pieces of the relative position information used to calculate the relative movement straight line is varied depending on the size of the curve as described above, it is preferable that the relative position information, which is provided at the most proximal position with respect to the vehicle 1, is used for the calculation as more preferentially as possible.

If it is judged that the obstacle and the vehicle 1 may collide with each other based on the judgment result of this collision judgment process, an instruction is issued from the collision judging unit 12 to the alarm informing unit 13 and the seat belt control unit 14. The respective control units inform the driver 2 of the fact that the dangerous state arises, by means of the display device of the in-vehicle device 6, the speaker 7, and the seat belt 4. Accordingly, it is possible to avoid the collision with the obstacle beforehand.

Second Embodiment

Figure 8:
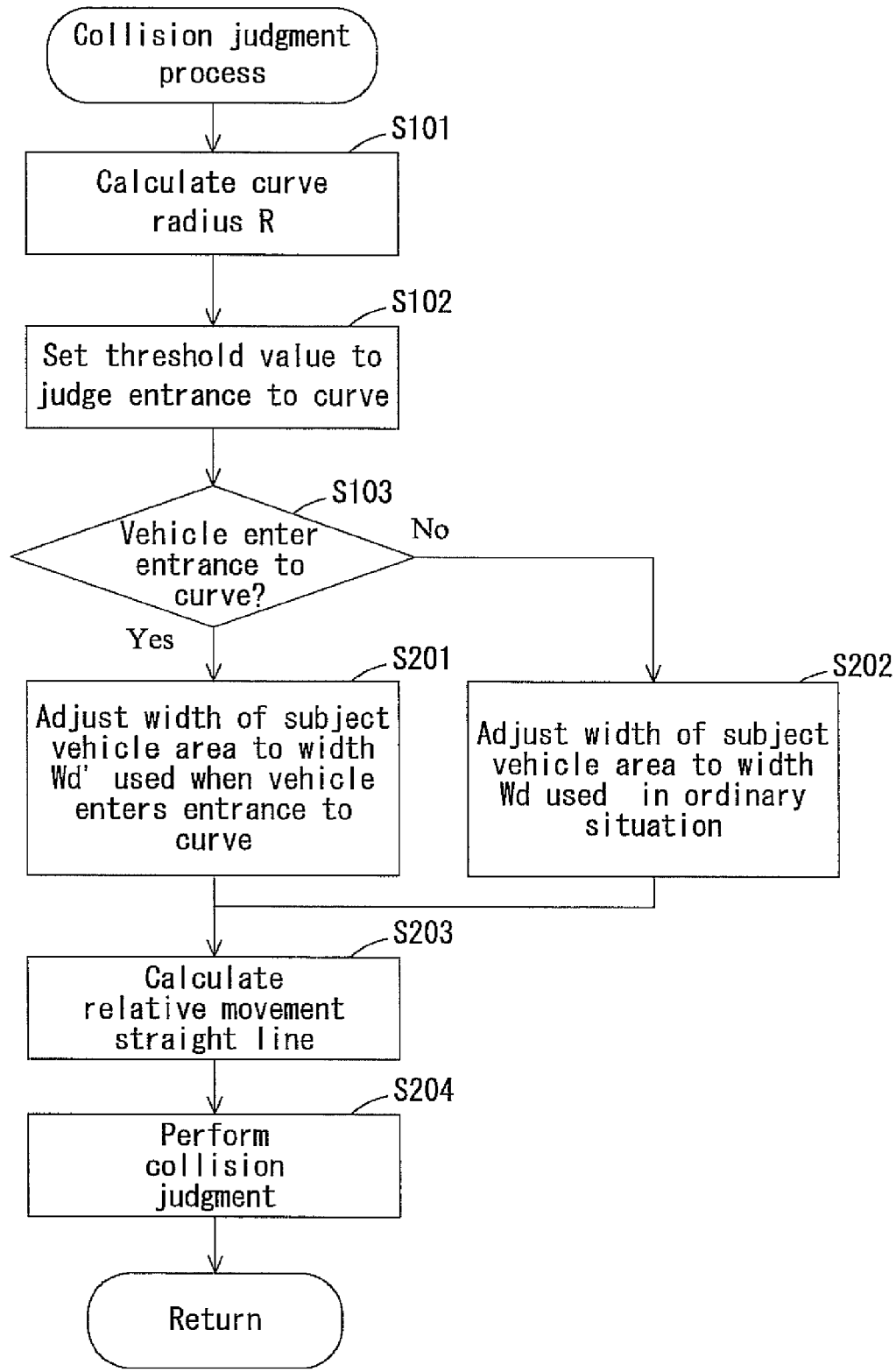
FIG. 8 shows a second flow chart in relation to the collision judgment process executed by the vehicle safety controller shown in FIG. 1.

An explanation will be made based on FIG. 8 about a second embodiment of the collision judgment process performed by the collision judging unit 12 of the vehicle safety controller 10 according to the present invention. FIG. 8 shows a flow chart of the collision judgment process to judge the collision between the vehicle 1 and the obstacle against the vehicle 1. The process is realized by a control program to be executed in the vehicle safety controller 10. The same processes as those of the collision judgment process shown in FIG. 3 described above are designated by the same reference numerals, any detailed explanation of which is omitted.

Figure 9:
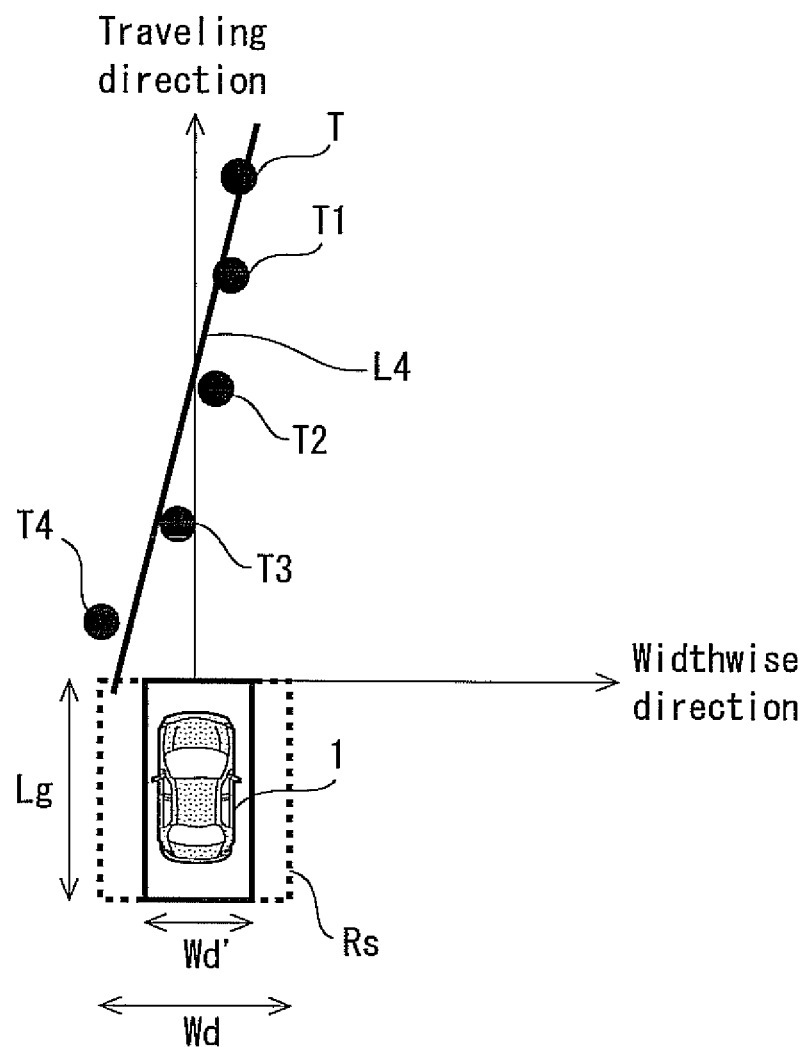
FIG. 9 shows a correlation between the relative movement straight line and a subject vehicle area of the vehicle when the collision judgment process shown in FIG. 8 is executed.

In this embodiment, if the affirmative judgment is made in S103, the routine proceeds to S201. If the negative judgment is made, the routine proceeds to S202. In S201, the width of the subject vehicle area Rs of the vehicle 1, which is to be used in the collision judgment, is adjusted to the width Wd' to be provided when the vehicle 1 is entering the entrance to the curve. On the other hand, in S202, the width of the subject vehicle area Rs is maintained to the width Wd to be provided in the ordinary situation shown in FIG. 4, i.e., to be provided when the vehicle 1 is not entering the entrance to the curve. As shown in FIG. 9, the width Wd', which is provided when the vehicle 1 is entering the entrance to the curve, has the value which is smaller than that of the width Wd which is provided in the ordinary situation. The processes in S201 and S202 correspond to the process performed by the adjusting unit according to the present invention. The situation, in which the process in S202 is performed, also includes the situation which is provided after the vehicle enters the entrance to the curve and the vehicle passes through the entrance to the curve.

If the process in S201 or S202 is completed, the relative movement straight line is calculated in the collision judgment. In this embodiment, unlike the embodiment described above, the number of pieces of the relative position information of the obstacle used to calculate the relative movement straight line is the same irrelevant to whether or not the vehicle 1 is entering the entrance to the curve. If the process in S203 is completed, the routine proceeds to S204. In S204, the collision between the vehicle 1 and the obstacle 30 is judged based on the correlation between the subject vehicle area Rs adjusted in S201 or S202 and the relative movement straight line calculated in S203.

In this embodiment, when the vehicle 1 enters the entrance to the curve, the width of the subject vehicle area Rs is narrowed to separate or increase the distance between the relative movement straight line and the vehicle 1. Accordingly, it is possible to perform the collision judgment between the vehicle 1 and the obstacle 30 precisely based on the large displacement of the obstacle 30 in the widthwise direction of the vehicle 1 when the vehicle 10 actually enters the entrance to the curve, i.e., the relative displacement in which the obstacle 30 is separated far from the vehicle 1. Therefore, in this embodiment, as shown in FIG. 9, the relative movement straight line L4 (same as the relative movement straight line L2 shown in FIG. 6), which is calculated in S203, does not intersect the area Rs in which the width is narrowed to Wd'. Therefore, it is judged that the obstacle 30 and the vehicle 1 do not collide with each other. In the embodiment described above, when the relative movement straight line is calculated in S203, the number of pieces of the relative position information of the obstacle used to calculate the relative movement straight line is identical irrelevant to whether or not the vehicle 1 is entering the entrance to the curve. However, as described in the foregoing first embodiment, the number of pieces of the relative position information of the obstacle to be used may be decreased when the vehicle 1 is entering the entrance to the curve as compared with when the vehicle 1 is not entering the entrance to the curve.

Further, the value of the width Wd' of the subject vehicle area Rs adjusted in S201 may be varied depending on the size of the curve of the cruising road. When the curve radius is small, then the relative displacement amount of the obstacle 30 in the widthwise direction of the vehicle 1 is large, and hence the value of the width Wd' may be further narrowed as compared with when the curve radius is large.

Third Embodiment

Figure 10:
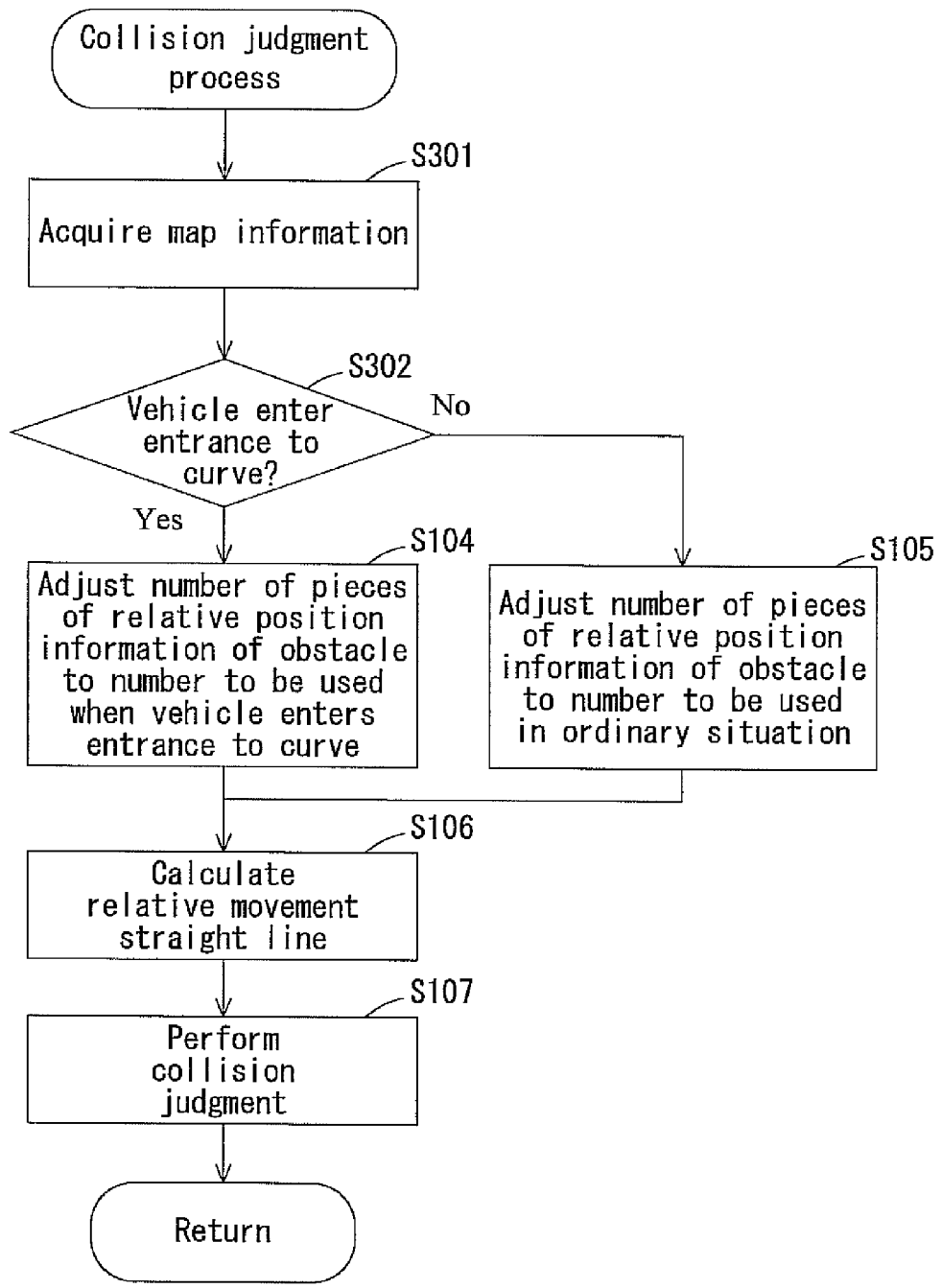
FIG. 10 shows a third flow chart in relation to the collision judgment process executed by the vehicle safety controller shown in FIG. 1.

An explanation will be made based on FIG. 10 about a third embodiment of the collision judgment process performed by the collision judging unit 12 of the vehicle safety controller 10 according to the present invention. FIG. 10 shows a flow chart of the collision judgment process to judge the collision between the vehicle 1 and the obstacle against the vehicle 1. The process is realized by a control program to be executed in the vehicle safety controller 10. The same processes as those of the collision judgment process shown in FIG. 3 described above are designated by the same reference numerals, any detailed explanation of which is omitted.

In this control, in S301, the map information of the road on which the vehicle 1 travels is firstly acquired. Specifically, the map information of the road, which corresponds to the present position of the vehicle 1 recognized by the car navigation unit 62, is acquired by the collision judging unit 12 from the map information storage unit 61 possessed by the in-vehicle device 6. The map information of the road, which is stored by the map information storage unit 61, also includes the position, the shape, and the size of the curve of the road. Accordingly, the collision judging unit 12 can judge on what road the vehicle 1 travels in real time. Thus, if S301 is completed, the routine proceeds to S302. It is judged whether or not the vehicle 1 is entering the entrance to the curve based on the map information acquired in S301. In this embodiment, the judgment, in which the map information possessed by the in-vehicle device 6 is utilized, is performed in place of the judgment of the entry into the entrance to the curve in which the vehicle velocity and the yaw rate of the vehicle 1 are utilized as in the embodiment described above. According to the concerning judgment, it is possible to avoid any erroneous judgment which would be otherwise made by being affected by the yaw rate concerning the judgment of the entry into the entrance to the curve. If the affirmative judgment is made in S302, the process in S104 and the followings as performed in the foregoing embodiment are performed. If the negative judgment is made, the process in S105 and the followings are performed.

It is also possible to precisely judge the collision between the obstacle 30 and the vehicle 1 by performing the judgment of the entry into the curve based on the map information as described above. Based on the fact that the recognition of the present position of the vehicle 1, which is performed by the car navigation unit 62, is slightly deviated from the actual position in some cases, it is also appropriate to use, in combination, the judgment of the entry into the entrance to the curve based on the map information as performed in this embodiment and the judgment of the entry into the entrance to the curve based on the use of the vehicle velocity V and the yaw rate ω as performed in the embodiment described above.

In this case, any one of the judgment results, to which the priority is given, may be appropriately set.

PARTS LIST

1: vehicle, 2: driver, 4: seat belt, 6: in-vehicle device, 7: speaker, 10: vehicle safety controller, 20: radar device, 21: vehicle velocity sensor, 22: yaw rate sensor, L1, L2, L3: relative movement straight line, Rs: subject vehicle area.

The invention claimed is:

1. A collision judgment apparatus for a vehicle, comprising:
   a position information acquiring unit which acquires position information of an obstacle positioned in a traveling direction of the vehicle based on a received signal obtained by transmitting an electromagnetic wave from the vehicle to the obstacle and receiving a reflected wave from the obstacle;
   a collision judging unit which judges collision between the vehicle and the obstacle based on a relative positional relationship between a subject vehicle position of the vehicle and a relative movement straight line of the obstacle with respect to the vehicle as calculated based on a plurality of pieces of the position information acquired by the position information acquiring unit in relation to the obstacle;
   a curve judging unit which judges a curved state of a cruising road on which the vehicle travels; and
   an adjusting unit which adjusts the relative positional relationship between the relative movement straight line and the subject vehicle position so that a distance between the relative movement straight line and the subject vehicle position is more separated in a widthwise direction of the vehicle if it is judged by the curve judging unit that the vehicle is entering an entrance to a curve as compared with a situation in which the vehicle is not entering the entrance to the curve when collision judgment is performed by the collision judging unit.

2. The collision judgment apparatus for the vehicle according to claim 1, wherein the adjusting unit decreases the number of pieces of the position information of the obstacle used to calculate the relative movement straight line when the vehicle is not entering the entrance to the curve to provide a predetermined number of pieces of the position information from which one piece or a plurality of pieces of the position information provided on a distal side with respect to the vehicle is/are excluded so that the relative movement straight line, which is to be set if it is judged that the vehicle is entering the entrance to the curve, is set thereby.

3. The collision judgment apparatus for the vehicle according to claim 2, wherein the adjusting unit changes the predetermined number of pieces of the position information of the obstacle in order to calculate the relative movement straight line depending on a size of the curve of the cruising road as judged by the curve judging unit.

4. The collision judgment apparatus for the vehicle according to claim 1, wherein:
   the collision judging unit judges that the vehicle collides with the obstacle if the relative movement straight line of the obstacle interferes with a subject vehicle area corresponding to the subject vehicle position of the vehicle; and
   the adjusting unit narrows the subject vehicle area in a widthwise direction intersecting the traveling direction of the vehicle if it is judged by the curve judging unit that the vehicle is entering the entrance to the curve.

5. The collision judgment apparatus for the vehicle according to claim 1, wherein:
   the curve judging unit judges the curved state of the cruising road in accordance with a predetermined parameter in relation to an amount of change of a size of the curve calculated based on a vehicle velocity and a yaw rate of the vehicle; and
   the predetermined parameter is variable depending on the vehicle velocity of the vehicle.

6. The collision judgment apparatus for the vehicle according to claim 5, wherein the predetermined parameter is set so that it is difficult for the curve judging unit to judge that the vehicle is entering the entrance to the curve if the vehicle velocity of the vehicle is low as compared with if the vehicle velocity is high.

7. The collision judgment apparatus for the vehicle according to claim 1, wherein the adjusting unit restores the relative positional relationship between the relative movement straight line and the subject vehicle position in the collision judgment performed by the collision judging unit to a state provided before the vehicle enters the entrance to the curve, if it is judged by the curve judging unit that the vehicle passes through the entrance to the curve.

8. The collision judgment apparatus for the vehicle according to claim 2, wherein:
   the curve judging unit judges the curved state of the cruising road in accordance with a predetermined parameter in relation to an amount of change of a size of the curve calculated based on a vehicle velocity and a yaw rate of the vehicle; and
   the predetermined parameter is variable depending on the vehicle velocity of the vehicle.

9. The collision judgment apparatus for the vehicle according to claim 3, wherein:
   the curve judging unit judges the curved state of the cruising road in accordance with a predetermined parameter in relation to an amount of change of a size of the curve calculated based on a vehicle velocity and a yaw rate of the vehicle; and
   the predetermined parameter is variable depending on the vehicle velocity of the vehicle.

10. The collision judgment apparatus for the vehicle according to claim 4, wherein:
    the curve judging unit judges the curved state of the cruising road in accordance with a predetermined parameter in relation to an amount of change of a size of the curve calculated based on a vehicle velocity and a yaw rate of the vehicle; and
    the predetermined parameter is variable depending on the vehicle velocity of the vehicle.

* * * * *